Feb. 6, 1940. G. A. UNGAR 2,189,049
V BELT
Filed July 17, 1937 3 Sheets-Sheet 1

INVENTOR.
Gustave A. Ungar
BY
ATTORNEY.

Feb. 6, 1940.   G. A. UNGAR   2,189,049
V BELT
Filed July 17, 1937   3 Sheets-Sheet 2

INVENTOR.
Gustave A. Ungar
BY Samuel Ostrolenk
ATTORNEY.

Feb. 6, 1940.    G. A. UNGAR    2,189,049
V BELT
Filed July 17, 1937    3 Sheets-Sheet 3
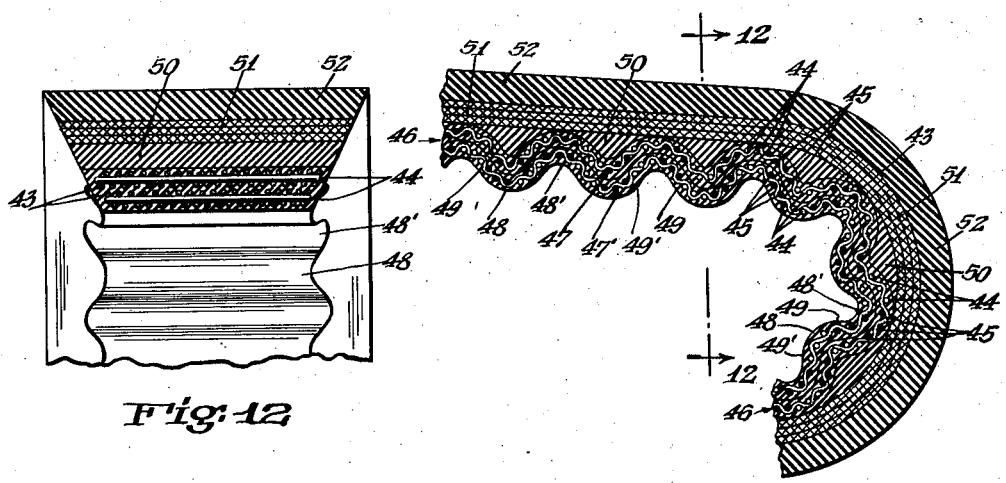
Fig. 12
Fig. 11
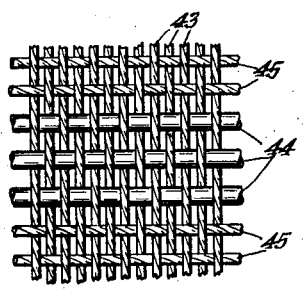
Fig. 13
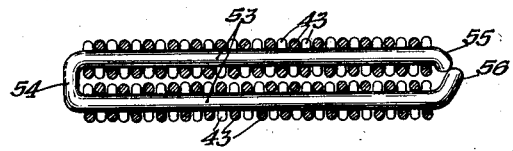
Fig. 14
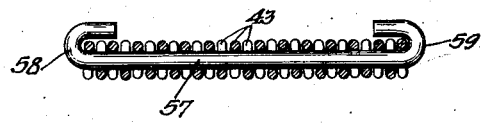
Fig. 15
INVENTOR.
Gustave A. Ungar
BY
ATTORNEY.

Patented Feb. 6, 1940

2,189,049

UNITED STATES PATENT OFFICE 2,189,049

V BELT

Gustave Adolphe Ungar, Pelham Manor, N. Y.

Application July 17, 1937, Serial No. 154,144

6 Claims. (Cl. 74—233)

My invention relates to power transmission mechanisms and has more particular reference to the V belts employed in such mechanisms for transmitting variable speeds from a constantly driven driving shaft.

The V belts employed at the present time are divided into two general types. The first consists of V shaped blocks, generally made of wood provided with frictional facings, usually of leather. These blocks are firmly attached to leather or fabric belts in suitably spaced positions. This type of V belt has good power transmission ability over a relatively wide range of speed ratios owing to its lateral stiffness but is limited to relatively low operating speeds owing to lack of flexibility and excessive axial loads necessary to overcome the effect of centrifugal forces.

The second type consists of rubber fabric composed V sections, made up so as to permit pull through a center portion, compression and lateral stiffness in an inner section and expansion in an outer section. This type of belt is suitable for operation at high speed but it has been limited heretofore to the transmission of comparatively light loads and to relatively small speed ratios due to the absence of sufficient lateral stiffness, which is necessary to transmit power through the frictional resistance of the tapered side faces of the belts, moreover, it is also necessary to provide a belt of sufficient width to obtain a large speed range. Various methods have been tried to increase lateral stiffness but they have either increased the internal friction of the belt, thereby causing early destruction, or the centrifugal forces were increased to such an extent as to make high speed operation impossible.

One of the primary purposes of my invention is to provide power transmission V belts of a strong, light and flexible construction to permit operation at high speed.

Another object of my invention is to provide V belts having ample lateral rigidity to permit the application of substantial axial forces necessary to transmit power of considerable magnitude.

Another object of my invention is to provide V belts of sufficient width and rigidity to permit a large variation of the diameter of the driving pulley so as to produce a wide range of speeds.

Another object of my invention is to provide a power transmission mechanism which is simple in construction, economical to manufacture, efficient in operation and durable in service.

Additional objects of my invention and the advantages thereof will be made evident hereinafter.

Referring to the drawings, Figure 1 is a vertical longitudinal section of a V belt transmission.

Figure 11 is a vertical longitudinal section of another modified type of V belt embodying my invention.

Figure 12 is a transverse section taken along line 12—12 of Figure 11.

Figure 13 is a plan view of the weave employed as a lateral stiffening element.

Figure 14 is a transverse section of the weave shown in Figure 13 when folded to provide a modification of the form shown in Figure 12.

Figure 15 is a transverse section of the weave shown in Figure 14 with a modified fold.

Figure 1:
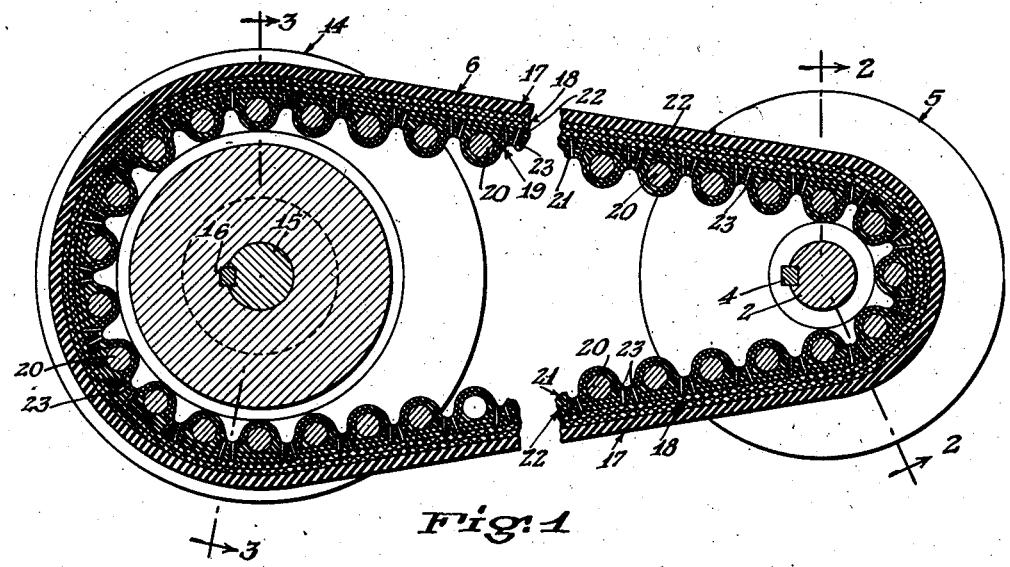
Figure 2:
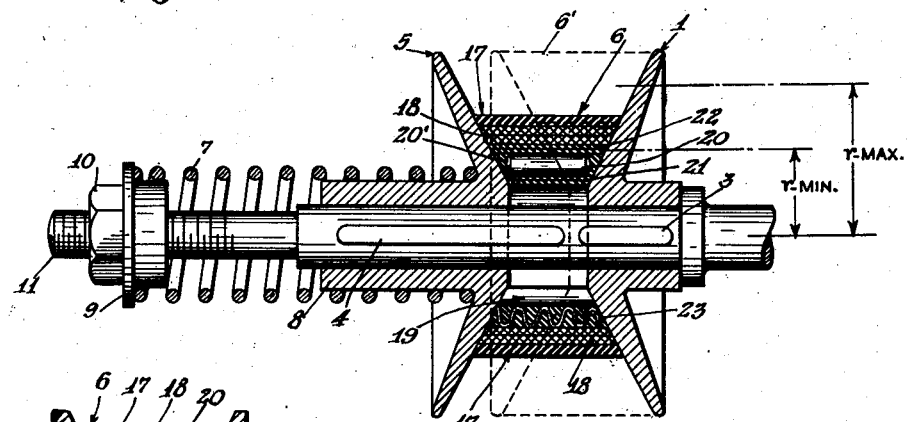
Figure 2 is a transverse section taken along line 2—2 of Figure 1.
Figure 3:
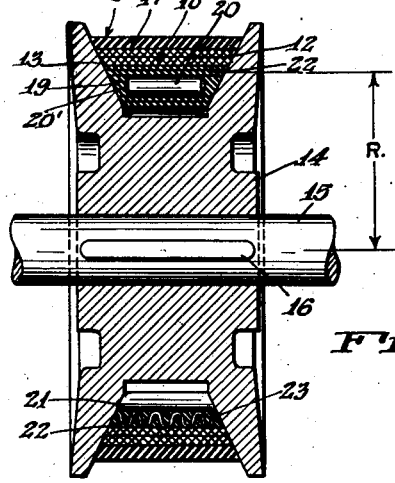
Figure 3 is a transverse section taken along line 3—3 of Figure 1.

Referring to Figures 1, 2 and 3, cone pulley 1 is mounted on shaft 2 and held in place by key 3. Shaft 1 is also provided with feather key 4, which is in driving engagement with the sliding cone pulley 5. The V belt 6, to be described in greater detail hereinafter, has tapered side faces which engage the cone pulleys 1 and 5. Frictional driving contact of the pulley 5 to belt 6 is produced by spring 7, one end of which is mounted on hub 8 of pulley 5 and the other end of which bears against shoulder 9 of adjusting nut 10 engaging with the threaded extension 11 of shaft 2.

Belt 6 also is in frictional driving contact with the conical faces 12 and 13 of the driven pulley 14 mounted on shaft 15 and driven through key 16. The operation of the power transmission that has just been described, is as follows:

Shaft 2 is operated by a source of power, as for instance, an electric motor at a constant number of revolutions per minute and it is mounted in one of the various arrangements well known to those skilled in the art so that its axial distance from shaft 15 can be varied at will.

In the position shown in Figure 2 with belt 6 in full lines, the two shafts 2 and 15 are spaced at their maximum distance and belt 6 is in driving contact with discs 1 and 5 with its smallest mean contact radius $r_{min}$. The driven pulley 14 is in frictional contact with belt 6 with its constant acting radius R. Pulley 14 will then be driven at the lowest number of output revolutions per minute $$r.\ p.\ m._{min} = R.\ P.\ M. \frac{r_{min}}{R}$$

in which r. p. m.$_{min}$ is the speed in revolutions per minute of pulley 14 and R. P. M. is the constant motor drive speed.

When shaft 2 while revolving is moved toward shaft 15 thereby reducing the center to center distance of the shafts 2 and 15, the belt 6 would tend to loosen the action of spring 7 forcing cone pulley 5 towards pulley 1 and belt 6 climbs up on the conical faces of pulley 1 and 5 to compensate for the reduced shaft spacing by engaging the pulley at points furthest away radially from the center of shaft 2. The other limit of this movement is reached when the belt has reached the position 6'. At this position, shaft 15 will be driven at the highest output speed, $$r.\ p.\ m._{max} = R.\ P.\ M. \frac{r_{max}}{R}$$

In order to transmit power by friction along the conical surfaces of the driving and driven pulleys, and in order to be able to cover a large speed range dependent upon the ratio of $r_{max}$ and $r_{min}$, belt 6 must be flexible to permit operation at widely varying drive radii $r_{max}$ and $r_{min}$ and at the same time it must have ample lateral width and stiffness. In the embodiment shown in Figures 1, 2 and 3, this is accomplished by the following construction of belt 6, which consists of three sections 17, 18 and 19. Section 17 consists of rubber or of rubber with lightly woven fabric inserted so as to permit expansion while under tension, when the belt is bent around the pulley. The ability of this section to stretch or expand produces an intimate frictional contact with the cone surfaces of the pulley. Section 18 consists of a tightly woven rubber fabric cord belt of great tensile strength, through which the load is transmitted between the driving pulley 1—5 and the driven pulley 14. Section 19 is a belt-like structure consisting of a number of light metal rods 20, which are surrounded on the inside by one or more plies of fabric 21 and on the outside by one or more plies of fabric 22. Fabric layers 21 are bent around rods 20 until they touch fabric layers 22 and they are securely fastened to layers 22 by means of stitches or staples 23, thereby separating rods 20 from one another.

All the fabric hereinbefore described is thoroughly impregnated with unvulcanized rubber, before being assembled into the sections 17, 18 and 19.

These three sections are then assembled and compressed together in a suitable flat or cylindrical mold until the rubber fills all the interstices between fabric and metal rods 20. Vulcanization of the assembly completes the belt.

It will be seen from the above that the construction of section 19 permits the reenforcing rods 20 to produce the requisite lateral stiffness without in any way interfering with the flexibility of this section and the belt as a whole. At the same time rods 20 are prevented from shifting in relation to their surrounding fabric layers 21 and 22 by being positioned through the stitches or staples 23. This prevents internal friction when the belt is flexed and avoids the generation of destructive heat.

The rods 20 have rounded ends 20' and they are preferably made from light magnesium or aluminum alloy although tubular reenforcing rods with closed rounded ends 20' can be also made from steel, properly copper coated in order to provide a bond with the rubber during vulcanization.

When manufactured as an endless form of predetermined length the fabric parts of section 19 are made slightly longer than the required length and the two ends are joined together by overlapping the extending fabric ends of fabric layers 21 and of 22 and then holding them together by stitches 23. The closed section 19 is then placed around a suitable corrugated cylindrical mold or drum. Section 18 is then tightly wrapped around section 19 in the number of plies required and finally section 17 is placed around section 18. The belt is then vulcanized.

If the belt is manufactured in flat style, section 19 is placed over a flat rack shaped mold, section 18 is stretched flat over it and section 17 on top. The mold is closed and compressed and the flat belt then vulcanized.

Figure 4:
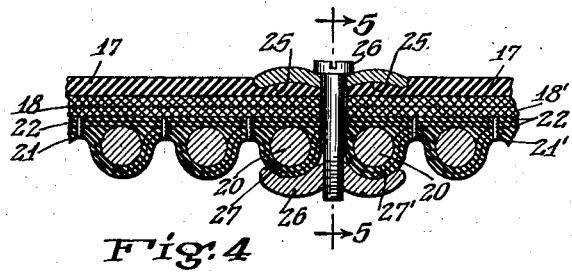
Figure 4 is a longitudinal section of a V belt embodying my invention in conjunction with a belt lock or fastener.
Figure 5:
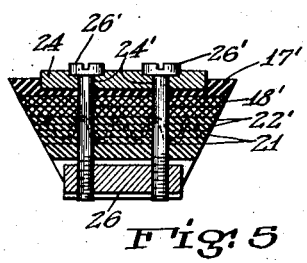
Figure 5 is a transverse section taken along line 5—5 of Figure 4.

In order to make an endless belt out of the above described flat belt the locking device or fastener illustrated in Figures 4 and 5 is employed. The belt ends 17 and 17', 18 and 18', 22 and 22', 21 and 21' are placed together. The outer clamping plate 24 with its concave undersides 25 and 25' is placed over 17 and 17'. The inner clamping plate 26 with concave top faces 27 and 27' is placed underneath layers 21 and 21'. Screws 26' are inserted through the holes 24' and threaded into plate 26. The concave recesses 25, 25' and 27, 27' respectively penetrate to a certain depth into the belt. Plate 26 clamps rods 20 and 20" and this together with the frictional surface grip of plates 24 and 26 securely joins the two belt ends together with very little effect upon the flexibility of the belt.

Figure 7:
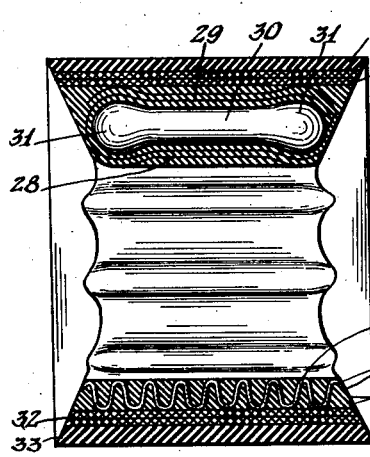
Figure 7 is a transverse section taken along line 7—7 of Figure 6.
Figure 6:
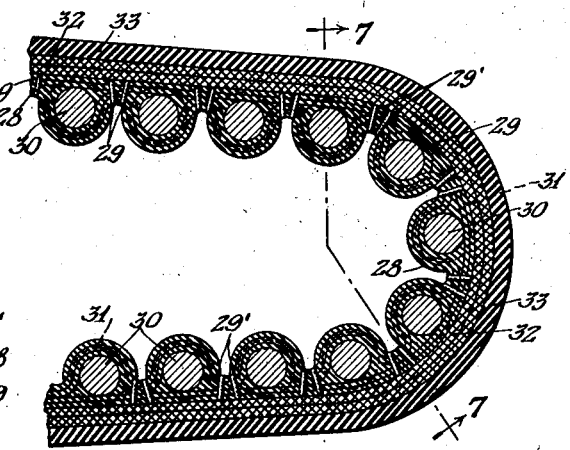
Figure 6 is a vertical longitudinal section of a V belt employed in the power transmission illustrated in Figures 2 and 3.

In the embodiment shown in Figures 6 and 7 a modified type of stiffening rods is shown. The compression section of the belt consists here of an inner rubber-fabric layer 28, an outer rubber-fabric layer 29 and rods 30. These rods have ball shaped ends 31, 31'. Fabric layer 28 is folded around the inner parts of rods 30 and fastened with stitches or staples 29' to the flat fabric layer 29. The enlarged ends 31, 31' of rod 30 provide an increased pressure surface to the rubber between the rods and the conical pulleys and also prevent rods 30 from slipping axially in relation to layers 28 and 29. Driving section 32 and expansion section 33 are arranged in the same manner as the corresponding sections 18 and 17.

Figure 9:
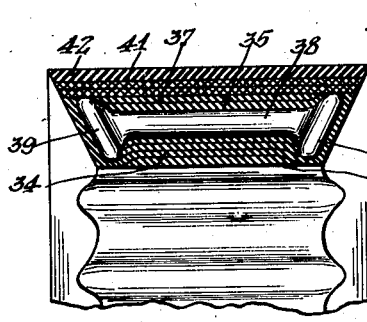
Figure 9 is a transverse section taken along line 9—9 of Figure 8.
Figure 8:
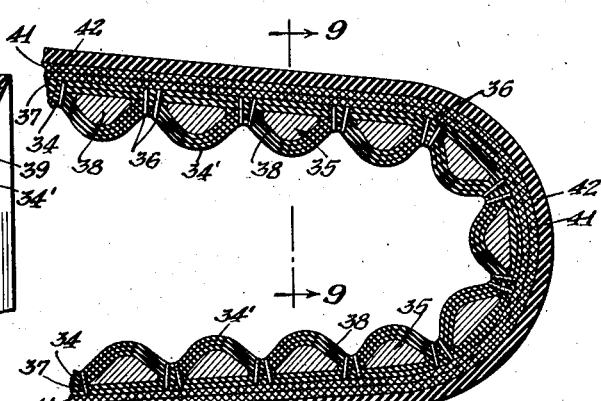
Figure 8 is a vertical longitudinal section of a modified type of V belt embodying my invention.
Figure 10:
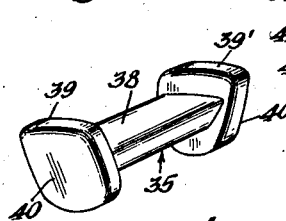
Figure 10 is a view in perspective of the lateral stiffening element employed in the V belt illustrated in Figures 8 and 9.

In the embodiment shown in Figures 8, 9 and 10 another modification of the stiffening rods is shown. The inner fabric layer 34 of the compression section is here folded around rod 35 and joined by stitches 36 to the flat outer fabric layer 37. Layers 34 and 37 are placed around the triangular section 38 of the rods 35. The ends of rods 35 are formed by flanges 39 and 39'. These flanges keep layers 34 and 37 from shifting laterally along rods 35. Their inclined faces 40 and 40' form large surfaces to transmit the axial thrust between belt and pulley. The driving section 41 and the expansion section 42 are again arranged in the same manner as sections 18 and 17. As described before, rubber, indicated here by 34', fills out all the interstices between fabric and rods.

In the embodiment shown in Figures 11 and 12, the compression section of the belt is formed from the woven strip shown in Figure 13. The warp 43 consists of cotton cord and the weft consists of one to three metal rods 44 alternating with two to three cotton cords 45. This fabric forms the compression section 46 in one or more plies 47 and 47'. These plies are arranged in waves in such a manner that the cotton weft 45 forms the crests 48 and 48' while the metal rods 44 form the sides 49 and 49' of the waves. The upper valleys 50 of section 46 are filled with rubber and drive sections 51 and expansion section 52 are then placed in the same manner as previously described for sections 18 and 17.

By placing the metallic weft rods 44 in the position described, it is now possible to flex the belt without causing movement and consequent frictional heating between the rubber, warp 43 and the metal rods 44. The flexing takes place only in the cotton wefts 45 which causes no appreciable heating.

Figure 14 represents a modification of the arrangement of the special weave employed in the compression section. After providing a woven band of twice the chosen belt width, the band is folded over in the middle to form a double ply. The weft rods 53 are thereby bent in the center at 54 and the two ends 55 and 56 are finally bent over slightly. This prevents the possibility of the rods shifting axially in relation to warp 43.

Figure 15 shows another modification of the special woven band used in the compression section. There the woven band is used in one or more single plies. The metal weft rods 57 have bent over ends 58 and 59 to prevent them from slipping off the warp. The belt construction otherwise is the same as that illustrated in Figures 11 and 12.

I claim:

1. A V belt for operation over cone surfaces of pulleys comprising a longitudinally stretchable section, a section providing for tensile strength for load transmission and a section providing for lateral stiffness of the belt, said latter section not interfering with the flexibility of the belt, avoiding the generation of frictional heat and comprising metallic members embedded in said last mentioned section encased within a protecting fabric and individually positively positioned in spaced relation to each other.

2. A V belt for operation over cone surfaces of pulleys comprising a longitudinally stretchable section, a section providing for tensile strength for load transmission and a section providing for lateral stiffness of the belt, said latter section not interfering with the flexibility of the belt, avoiding the generation of frictional heat and comprising metallic members embedded in said last mentioned section, each individually encased within a protecting envelope of fabric whereby said members are positively positioned relative to each other.

3. A V belt for operation over cone surfaces of pulleys comprising a longitudinally stretchable section, a section providing for tensile strength for load transmission and a section providing for lateral stiffness of the belt, said latter section not interfering with the flexibility of the belt, avoiding the generation of frictional heat and comprising metallic members embedded in said last mentioned section, each individually encased within a protecting envelope of fabric whereby said members are positively positioned relative to each other, each of said metallic members comprising a rod laterally arranged within said belt, each rod being rounded at the ends adjacent the sides of the belt.

4. A V belt for operation over cone surfaces of pulley comprising a longitudinally stretchable section, a section providing for tensile strength for load transmission and a section providing for lateral stiffness of the belt, said latter section not interfering with the flexibility of the belt, avoiding the generation of frictional heat and comprising metallic members embedded in said last mentioned section, each individually encased within a protecting envelope of fabric whereby said members are positively positioned relative to each other, each of said metallic members comprising a rod laterally arranged with said belt, each rod having flanges at the ends adjacent the sides of the belt.

5. A V belt for operation over cone surfaces of pulley comprising a longitudinally stretchable section, a section providing for tensile strength for load transmission and a section providing for lateral stiffness of the belt, said latter section not interfering with the flexibility of the belt, avoiding the generation of frictional heat and comprising metallic members embedded in said last mentioned section, each individually encased within a protecting envelope of fabric whereby said members are positively positioned relative to each other, each of said metallic members comprising a rod laterally arranged within said belt, each rod having flanges at the ends adjacent the sides of the belt, said flanges extending in a plane parallel to the adjacent side of the belt.

6. A V belt for operation over cone surfaces of pulleys comprising a longitudinally stretchable section, a section providing for tensile strength for load transmission and a section providing for lateral stiffness of the belt, said latter section not interfering with the flexibility of the belt, avoiding the generation of frictional heat and comprising metallic members embedded in said last mentioned section encased within a protecting fabric and individually positively positioned in spaced relation to each other by the intercrossing therewith of threads of the fabric of said encasing element.

GUSTAVE ADOLPHE UNGAR.